Feb. 16, 1965  W. R. SCHOLLE  3,169,690
CONTAINER
Filed Oct. 20, 1961  5 Sheets-Sheet 1
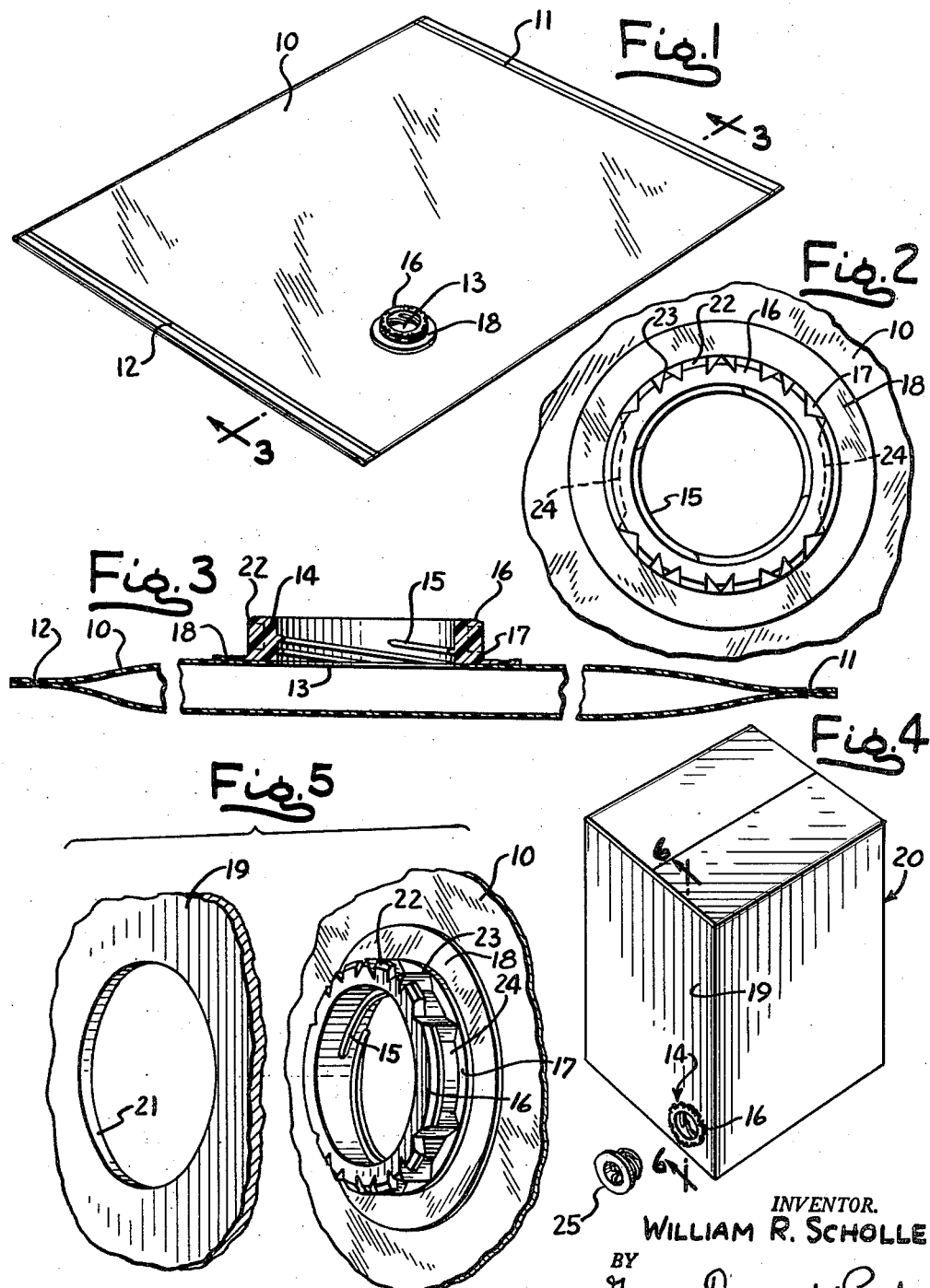
INVENTOR.
WILLIAM R. SCHOLLE
BY
Gary, Desmond & Parker
ATTYS.

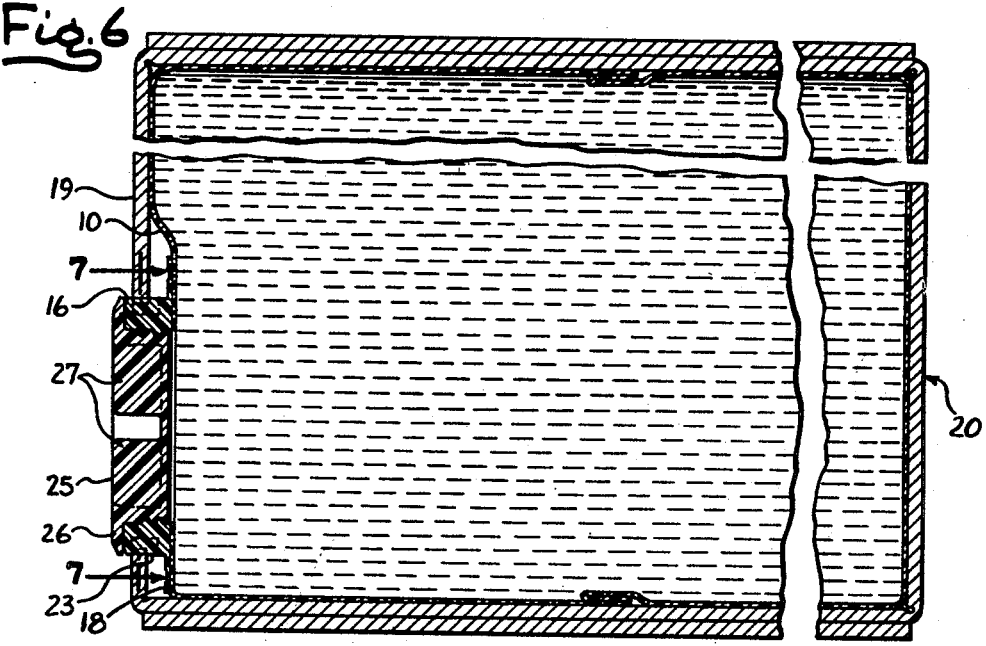
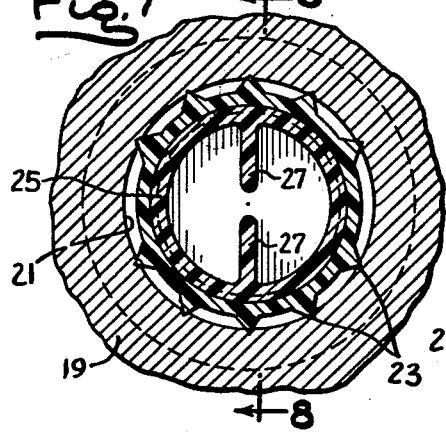
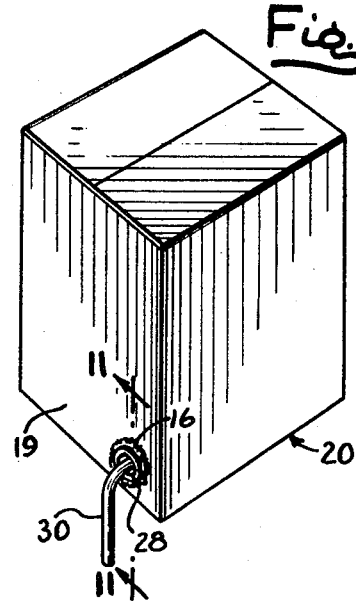
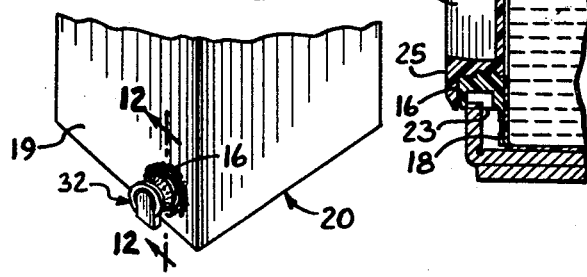

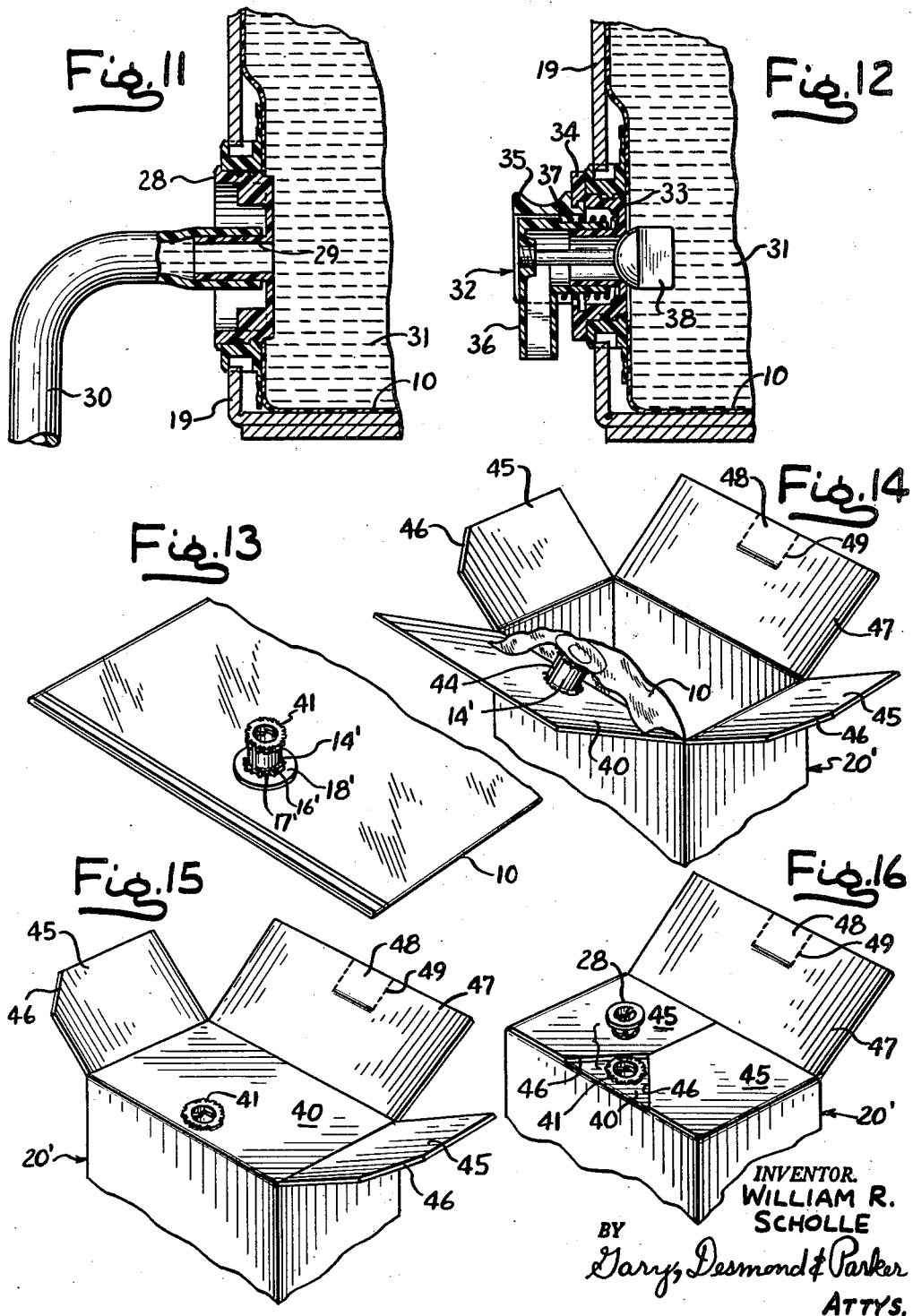

Feb. 16, 1965 W. R. SCHOLLE 3,169,690
CONTAINER
Filed Oct. 20, 1961 5 Sheets-Sheet 4
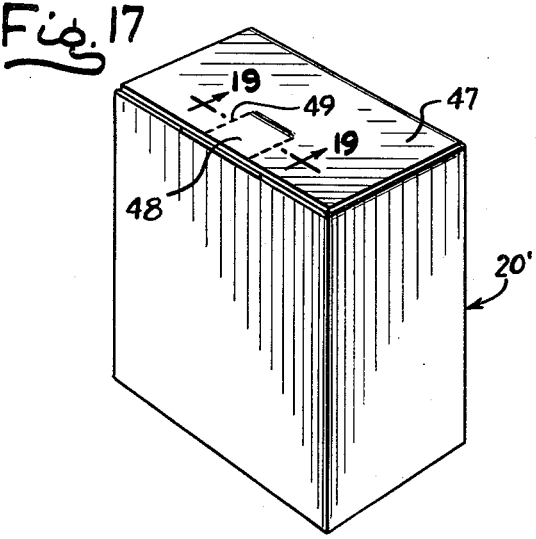
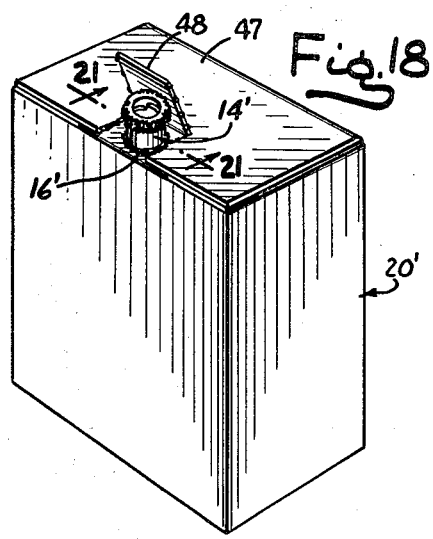
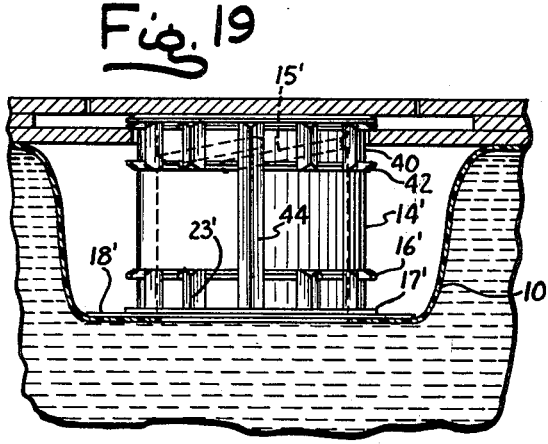
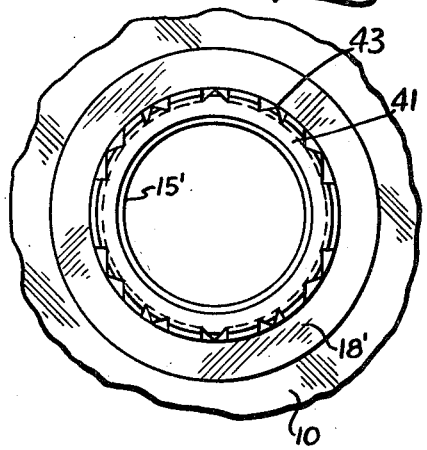
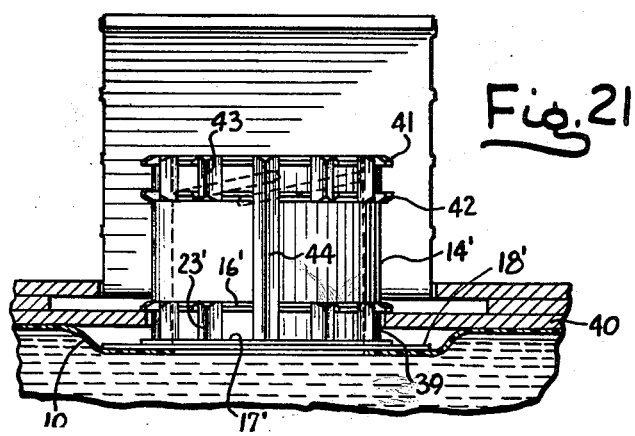
INVENTOR.
WILLIAM R. SCHOLLE
BY
Gary, Desmond & Parker
ATTYS.

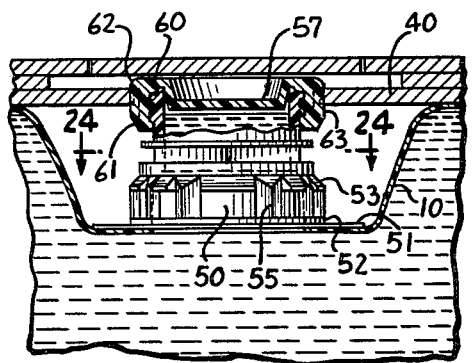
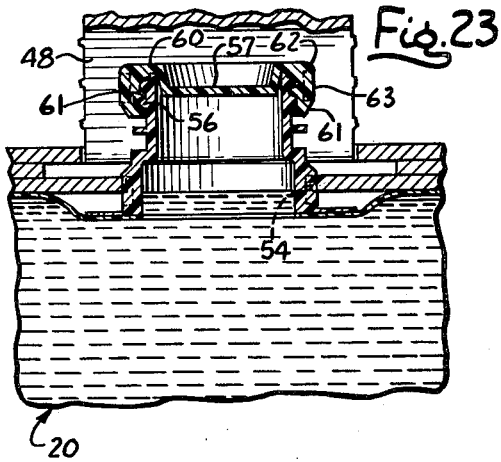
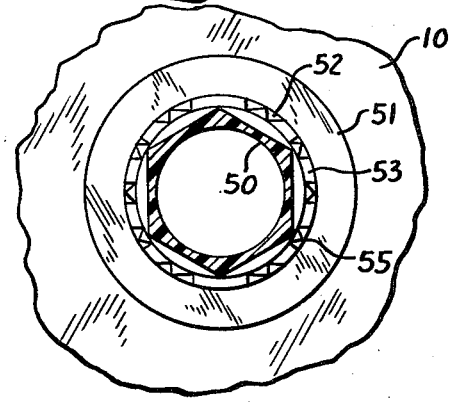
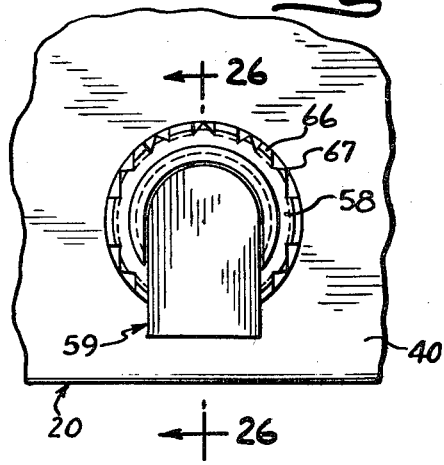
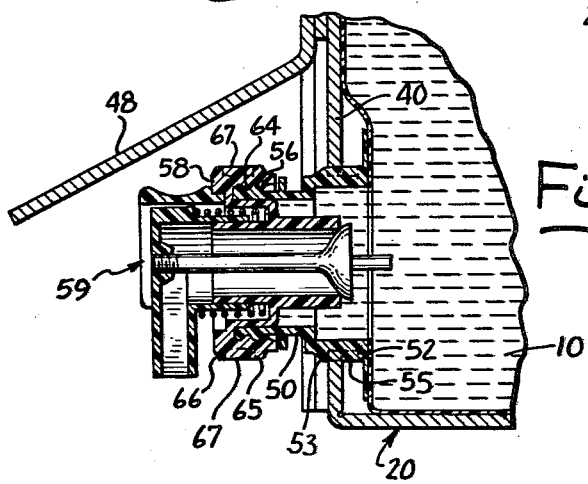

United States Patent Office 3,169,690
Patented Feb. 16, 1965

3,169,690
CONTAINER
William R. Scholle, Newport Beach, Calif., assignor to Scholle Container Corporation, Long Beach, Calif., a corporation of Illinois
Filed Oct. 20, 1961, Ser. No. 146,487
16 Claims. (Cl. 229—14)

This invention relates to improvements in containers of the class wherein fluent materials, such as chemicals, for example battery acid, or food products such as milk, are packaged within liner bags composed of one or more plies of flexible thermoplastic material such as polyethylene, and the bag, before or after filling, is encased in a relatively rigid, rectangular paperboard outer container body.

It is a particular object of the present invention to provide containers of the class aforesaid with novel filling and pouring spout means.

Another object of the present invention relates to the association of means formed on the aforesaid spout with a circular aperture formed in a wall component of the aforesaid paperboard outer container body whereby the spout is retained against relative rotation and is further axially maintained in yieldably anchored relationship to the associated container wall.

Further objects and advantages relate to details of construction, arrangement of parts, and the economies thereof as will be apparent from a consideration of the following specification and accompanying drawings, wherein:

FIG. 1 is a perspective view of a collapsed liner bag having a filling and pouring spout associated therewith in accordance with the present invention.

FIG. 2 is an enlarged fragmentary detail plan view of the liner bag shown in FIG. 1, which is more specifically a plan view of the associated spout thereof.

FIG. 3 is a section on the line 3—3 of FIG. 1.

FIG. 4 is a container assembly formed in accordance with the present invention, the view being a partially exploded one showing a closure cap for the associated spout.

FIG. 5 is an enlarged fragmentary exploded perspective view showing the spout of the present invention associated with a liner bag and a section of an apertured carton wall before the two components are associated.

FIG. 6 is a section on the line 6—6 of FIG. 4.

FIG. 7 is a section on the line 7—7 of FIG. 6.

FIG. 8 is a section on the line 8—8 of FIG. 7.

FIG. 9 is a perspective view of a container assembly formed in accordance with the present invention, further illustrating a dispenser adapter associated with a pouring spout.

FIG. 10 is a fragmentary view of the container assembly of the present invention showing a dispensing spigot associated with a pouring spout thereof.

FIG. 11 is a relatively large fragmentary section on the line 11—11 of FIG. 9.

FIG. 12 is a relatively large fragmentary section on the line 12—12 of FIG. 10.

FIG. 13 is a fragmentary perspective view of a collapsed liner bag formed in accordance with the present invention showing a modified form of spout secured thereto.

FIG. 14 is a fragmentary perspective view of an assembly of the liner bag of FIG. 13 and an outer reinforcing paperboard container illustrating the spout associated with a wall of the container, which in this case is specifically one of the top closure flaps.

FIG. 15 is a progressive perspective detail view showing the spout of the liner bag of FIG. 14, the top side of the flap in one selective position.

FIG. 16 is a perspective view progressive to that of FIG. 15 showing two additional flaps closed down, further illustrating an exploded closure cap for the spout.

FIG. 17 is a perspective view progressive to that of FIG. 16 showing all the top flaps of the container closed down.

FIG. 18 is an operative view of the assembly of FIG. 17 showing the tear flap elevated and the spout of the liner bag in an elevated position.

FIG. 19 is an enlarged fragmentary section on the line 19—19 of FIG. 17.

FIG. 20 is an enlarged fragmentary detail plan view of the liner bag shown in FIG. 13 which is more specifically a plan view of the associated spout thereof.

FIG. 21 is a section on the line 21—21 of FIG. 18.

FIG. 22 is a fragmentary section similar to that of FIG. 19 showing a further modified form of the present invention.

FIG. 23 is a view progressive to that of FIG. 22 and similar to the illustration of FIG. 21.

FIG. 24 is a section on the line 24—24 of FIG. 22.

FIG. 25 is a fragmentary front elevational detail view of a spigot attached to the spout component of FIGS. 22–24 in a modified form of the present invention; and FIG. 26 is a fragmentary section on the line 26—26 of FIG. 25.

Referring to the drawings, the reference numeral 10 indicates a liner bag of conventional envelope type construction such as is generally formed of a seamless single or multiple ply thermoplastic film material such as polyethylene or polypropylene, heat-sealed at the edges, in this case at the opposed ends 11 and 12. The liner bag 10 is formed with an aperture 13 in one surface to provide communication to the interior thereof, over which aperture there is secured a nozzle or pouring and filling spout 14. This spout 14 is also desirably composed of the same material as the bag 10 but is of relatively thicker stock so as to give it rigidity and distinguish it from the free flexibility and collapsibility of the liner bag 10. The spout 14 is provided with a thread 15 which is here internal whereby a closure or other adapter may be secured thereto, as will be hereinafter explained.

The spout 14 is further provided, in accordance with the present invention, with a pair of spaced, annular, radially projecting rigid flanges 16 and 17 which are integral with the spout 14. Integral with the lowermost flange 17 is a further integral relatively flexible flange extension portion 18 by which the spout 14 is with facility heat-sealed to the surface of the liner bag 10, it being understood that when the liner bag 10 is composed of plural plies, the plies forming one surface of the bag are all sealed together at the point where the flange extension 18 is sealed to the liner bag 10.

The spacing between flanges 16 and 17 is substantially that of the paperboard container wall 19 with which the liner bag 10 is to be associated. The outer paperboard container indicated generally as 20 is composed of either solid paperboard or corrugated fiberboard, as is conventional in shipping containers. In any event, such construction is characteristically resilient, and this is particularly true in the case of corrugated paperboard.

In use, either before or after filling the liner bag 10, it is desirable that the spout 14 thereof be in a predetermined position for access thereto, and this is accomplished by providing the wall 19 with an aperture 21. It will be understood that the wall 19 may be the side wall illustrated, or may be an internal reinforcing component not shown, or any one of the top or bottom closure flap components of the outer fiberboard container. Thus, in order to insure that the spout 14 will be in the desired predetermined location, the flange 16 is of slightly greater diameter than the opening 21 but such that under slight pressure the flange 16 may be pressed through the defining peripheral edge of the aperture 21 which is slightly resilient due to its fiberboard construction and, as previously indicated although not specifically llustrated, its resiliency is enhanced when the wall 19 is of corrugated paperboard construction.

After the flange 16 is forced through the aperture 21 it remains adequately anchored thereover for the purpose herein contemplated, that is to say, anchored against inadvertent and undesirable retraction within the confines of the container 20. As an aid to projecting the flange 16 through the opening 21 the outer peripheral surface and edge of the flange 16 is beveled as at 22.

In view of the free flexibility and collapsibility of the liner bag 10 resulting from its thin film or sheet material construction, it is desirable that the spout 14 further be held in a nonrotatable position relative to the liner bag 10 and the container wall 19 so as to prevent undesirable twisting of the bag area adjacent the spout 14 and thus cutting the flow of the contents of the liner bag 10.

This object is accomplished in accordance with the present invention by providing the outer surface of the generally cylinderical spout 14 with a plurality of longitudinally extending radially projecting ribs, 23, these ribs extending between the flanges 16 and 17. These ribs or rather their apices project radially to substantially the same extent as the flange 16, so that when the flange 16 is projected through the aperture 21 the ribs 23 frictionally engage or bite into the defining edge of the aperture 21 to prevent relative rotation.

As illustrated, the flange 16 is suitably serrated with the ribs 23 extending between the serrations. Preferably no ribs are formed at the diametrically opposed cylindrical surface areas 24, 24 so as to leave an unobstructed flange 16 overhang thereat and to permit the spout 14 to be grasped by means of a forked instrument or two otherwise spaced parallel edge components of an instrumentality adapted to hold the spout against rotation and to be supported by the flange 16 during, for example, filling of the liner bag exterior of the carton, also in a nonrotatable manner, rotation being limited by the further angular projection of the ribs 23 at the defines of the unobstructed surface areas 24.

For illustrative purposes I have shown various means for closing and utilizing the spout 14. Thus FIGS. 4 to 8 show the association of a simple threaded closure cap, generally indicated as 25, the cap 25 having a suitably extended flange 26 and an internal finger hold 27, the flange 26 protecting the spout flange 16 in a sanitary manner, the recessed finger holds 27 providing means for ready manipulation of the cap 25. If desired, a film seal, not shown, may be extended over the cap 25 in engagement with the surrounding defining area of the container wall 19.

FIGS. 9 and 11 show an adapter 28 having a concentric integral tube 29 to which a flexible tube 30, endwise closed or medially clamped, may be secured for facilitating dispensing of the contents 31 from the liner bag 10.

FIGS. 10 and 12 show a spigot generally indicated as 32 associated with spout 14 comprising a body portion 33 in threaded engagement with the thread 15 of spout 14 having a flange 34 seating firmly on flange 16 of spout 14.

The spigot 32 carries an outer body portion 35 in rotatable engagement with the portion 34 and yieldably retains the spout portion 36, under the action of spring 37, extended outwardly to press the valve 38 associated with the spigot 36 in seated or closed position. Thus, the spigot 36 may be rotated so as to permit dispensing in, for example, the position of the container shown in FIG. 10 or by laying it on one of its sides to which the spigot 36 can then be conveniently rotated by means of its associated body portion 35. Pressing of the spigot portion 36 inwardly against the action of its spring 37 unseats valve 38 to permit the contents 31 to flow outwardly through spigot 36.

Thus, the employment of the container assembly with the associated spigot 32 conveniently permits the assembly to be employed for the packaging of milk by placing of the entire assembly in the refrigerator and the dispensing at will of limited quantities in a convenient manner, the whole being in part due to the manner in which the spout 14 is disposed through the outer container wall 19 and held first anchored against withdrawal therefrom and second in a nonrotatable manner in which it is anchored by means of the ribs 23.

FIGS. 13 to 21 illustrate an arrangement of similar construction and utility as to the form previously described, but in this case the spout 14' is relatively elongated so that it may be anchored in one of two positions with respect to a container surface: one flush with the container surface as in the forms previously described, and in the second position projected outwardly thereof for facilitating filling or dispensing. Thus, in this instance as in the form previously described, the spout 14' is provided with a pair of spaced flanges 16' and 17' disposed near the base thereof and with a plurality of ribs 23' which function with respect to an aperture 39 of relatively smaller diameter in a fiberboard container surface, in this case a closure flap 40 in a similar manner to that previously described with respect to aperture 21.

In this modified form, however, the elongated spout 14' is formed with a second axially spaced pair of annular flanges 41 and 42 between which extend a plurality of ribs 43. In this instance, two of the opposed ribs 43 and two of the opposed ribs 23' are replaced by the elongated ribs 44 which extend longitudinally the full length of the spout 14'. The outermost flange 41 may be beveled in a manner similar to that of flange 16' and flange 42 may be similarly provided with a beveled edge as shown. The flange 41 is serrated in a manner similar to flange 16' or flange 16 with the ribs disposed between serrations as previously described, and in this case flange 42 is likewise serrated.

The spout 14' may likewise be formed with an internal thread 15' for reception therein of a closure cap 28 or other devices as previously described with respect to spout 14.

Fig. 14 shows the spout 14' associated with a flap 40 of a fiberboard container 20 in a manner whereby only the top flange 41 is projected through the defines of the circular aperture formed in flap 40 and anchored therein against longitudinal or axial displacement by means of the flanges 41 and 42 and held against relative rotation by means of the ribs 43. This flap 40 may be closed as shown in FIG. 15 and the side flaps 45, 45 closed thereover, the flaps 45, 45 having desirably cut corners as at 46, 46 to expose the portion of flap 40 which has the spout 14' projected therethrough.

The spout may be left in this position as shown in FIG. 16 with the outermost flap 47 then closed down so that its perforated segment 48 overlies the flange 41 of spout 14'. For the purpose of access the flap 48 may be elevated as shown in FIG. 21, separating on its score lines 49. This gives access to the spout 14' and it may then be grasped and further withdrawn within the defines of container 20' by forcing the flap 42 through the opening 39 and likewise forcing the lower flange 16' through the opening 39 to a point where the flange 16 overlies the flap 40 and it is held anchored in such position thereby.

As previously indicated, the spout 14' is provided with a pair of opposed elongated ribs 44 and these serve as guides for retaining the position of the spout 14' with respect to the opening 39 in flap 40 so that the spout 14' will not be rotated during the time it is moved from one position to the other while being withdrawn. The extended position of spout 14' as shown in FIGS. 18 and 21 is for facilitating direct filling or direct pouring from the spout 14'.

FIGS. 22–26 illustrate another form of the present invention and more particularly a modified form of spigot generally indicated as 50 having a flexible base flange 51 in heat-sealed engagement to the liner bag 10 and about a communicating aperture therein, and immediately above this flexible flange 51 is a relatively rigid flange 52 of smaller diameter than the flange 51. Spaced from this flange 52 is the relatively rigid serrated flange 53, these flanges 52 and 53 being similar to flanges 17 and 16 respectively of the previously described form and similar axially spaced from each other a distance substantially the thickness of the paperboard outer container thickness wall or flap, which in this case may be a flap 40 of a container 20 such as in FIG. 16.

The diameter of the flanges 52 and 53 similarly is somewhat greater than the diameter of the circular aperture 54 of the carton, so that the flange 53 may be force-pressed therethrough and anchored over the defines of aperture 54, as shown for example in FIGS. 23 and 26, to hold the spout 50 in the desired extended position when, for example, it is desired to fill the liner bag 10 or to discharge its contents.

In order that the spout 50 may be held against rotation in such position, the spout is formed with a plurality of radially projecting, longitudinally extending ribs 55 extending into or between the serrations in the flange 53 as described with respect to the previous forms. Thus, similarly the ribs 55 extend radially to a distance such that when the flanges of the spout 50 are brought into the position shown in FIGS. 23 and 26, the ribs 55 are brought into frictional contact with the defines of aperture 54 similar to the showing of FIG. 7, and to thus prevent undesired rotation of the spout relative to its associated liner bag 10, and the carton wall.

In the form of FIGS. 22–26, the spout 55 has an elongated tubular portion projecting outwardly of the flange 53 and somewhat similar to the spout 14′, but in this case the outer end portion of the spout 50 is formed with an external thread 56. This spout is adapted to receive internally threaded closure means which may be the simple cap 57, the internally threaded sleeve 58 of spigot 59 which is generally similar to spigot 32, or an adapter such as adapter 28 shown in FIG. 11 or other similar closure, which as understood may be a dispensing type closure.

Referring to the closure cap 57 shown in FIGS. 22 and 23, in this case the cap has an outer depending rim portion 60 formed with an internal thread 61 for engagement with the thread 56 on spout 50. This dependent cap rim portion 60 is provided with a spaced pair of flanges 61 and 62 having a diameter equal to that of the flange 53, the flanges being edgewise beveled in a manner similar to the bevel on flanges 41 and 42 in the previous modification, and similarly have disposed between them the radially projecting, longitudinally extending ribs 63 for frictional engagement with the defining edge portion of aperture 54 when the spout 50 is disposed in the position shown in FIG. 22, whereby to hold the entire spout in inwardly projecting position, with the spout 50 held against rotation relative to the liner bag 10 and the carton surface by means of the ribs 63.

This recessed position is suitably one for transportation in a packed assembly. While FIG. 22 shows the spout 50 in the position recessed within the paperboard container and the flanges 60 and 61 in embracing engagement with the carton flap 40, it will be understood that in lieu of the flap 40 this engagement may be with an external flap or side wall as shown in FIGS. 4–12.

Referring more particularly to FIGS. 25 and 26, the sleeve portion 58 of spigot 59, which is somewhat equivalent to the portion 34 of spigot 32, is provided with an internal thread 64 for engagement with the external thread 56 on the outer end of spout 50. This sleeve portion 59 carries a pair of spaced annular flanges 65 and 66 with ribs 67 disposed therebetween, similar to the arrangement of the flanges 61 and 62 and the ribs 63 of the cap 57, whereby the spigot 59 may be recessed with its flanges 65 and 66 projected through and brought into embracing engagement with the defining edge of the aperture 54 in carton wall or flap 40, in the manner described with respect to cap 57. The spigot 59 is otherwise similar to the spigot 32 shown in FIG. 12 and may be employed in like manner for dispensing purposes, preferably when extended to the position shown in FIG. 26, and with the flanges 52 and 53 at the base of spout 50 in embracing engagement with the defines of the aperture 54 in carton wall component 40.

It will thus be apparent in all the foregoing forms and modifications that by employing a circular aperture in a carton wall or other carton component, I may dispose therethrough a spout extending from and secured to a flexible liner bag contained within the relatively rigid paperboard container, in either one position or more than one position when the spout is provided with more than one pair of relatively rigid flanges, each pair being adapted to be separably projected through and engaged in an adequately firm manner in anchored or embracing engagement with the carton wall. At the same time, by reason of the ribs which project between the flanges and which are of a radial extent such that they frictionally embrace the defines of the aforesaid aperture in a carton wall, the spout can be held against relative rotation without necessity for "indexing" or pre-alignment, that is, without necessity for providing an aperture in the carton wall which conforms with the irregular external shape of the spout, and with an attendant minimum of assembly costs and enhanced facility and simplicity in use, with firm security in assembly of the spout against accidental withdrawal into the container when such is not desired.

Although I have shown and described the preferred embodiments of my invention, it will be understood that changes may be made in the details thereof without departing from the broad scope as comprehended by the following claims.

I claim:

1. A flexible receptacle for fluent material composed of plastic sheet material, a relatively rigid cylindrical spout therefor secured to a surface of said receptacle about a communicating opening formed therein, a first integral external radially extending flange at the base of said spout, a second integral external radially extending flange on said spout spaced from the first flange, the latter being adapted to be frictionally projected through the defining edge of a circular aperture formed in a paperboard container wall of smaller diameter than said second flange, and a plurality of longitudinally extending radially projecting ribs adapted to be frictionally projected into said circular aperture-defining edge portion formed on the outer surface of said conduit intermediate said flanges, said second flange being composed of segments disposed between said ribs.

2. A flexible receptacle for fluent material composed of plastic sheet material, a relatively rigid cylindrical spout therefor secured to a surface of said receptacle about a communicating opening formed therein, a first integral external radially extending flange at the base of said spout, a second integral external radially extending serrated beveled edge flange on said spout spaced from the first flange, the latter being adapted to be frictionally projected through the defining edge of a circular aperture formed in a paperboard container wall of smaller diameter than said second flange, and a plurality of integral ribs on the outer surface of said conduit intermediate said flanges projecting to said serrations and adapted to be frictionally projected into said circular aperture-defining edge portion.

3. A flexible receptacle for fluent material composed of plastic sheet material, a relatively rigid cylindrical spout therefor secured to a surface of said receptacle about a communicating opening formed therein, a first integral external radially extending flange at the outer end of said spout, a second integral external radially extending flange on said spout spaced from the first flange and from the base of said spout, said flanges being adapted to be frictionally projected through the defining edge of a circular aperture formed in a resilient paperboard container wall of smaller diameter than said flanges, and a plurality of spaced longitudinally extending ribs adapted to be frictionally projected into said circular aperture-defining edge portion formed on the outer surface of said conduit intermediate said flanges to thereby prevent relative rotation.

4. A flexible receptacle for fluent material composed of plastic sheet material, a relatively rigid cylindrical spout therefor secured to a surface of said receptacle about a communicating opening formed therein, a first spaced pair of integral external radially extending flanges at the base thereof, and a second pair of integral external radially extending flanges on said spout spaced from the first flanges disposed adjacent the outer end of said spout, said spaced flanges being adapted to be frictionally projected through the defining edge of a circular aperture formed in a paperboard container wall of smaller diameter than said spaced flanges, and a plurality of ribs adapted to be frictionally projected into said circular aperture-defining edge portion formed on the outer surface of said conduit intermediate said flanges.

5. A flexible receptacle for fluent material composed of plastic sheet material, a relatively rigid cylindrical spout therefor secured to a surface of said receptacle about a communicating opening formed therein, a first integral external radially extending flange at the base of said spout, a second integral external radially extending flange on said spout spaced from the first flange, the latter being adapted to be frictionally projected through the defining edge of a circular aperture formed in a paperboard container wall of smaller diameter than said second flange, a plurality of ribs adapted to be frictionally projected into said circular aperture-defining edge portion formed on the outer surface of said conduit intermediate said flanges, said second flange being composed of segments disposed between said ribs, said spout including an externally threaded outer end portion of reduced diameter projecting beyond said flanges.

6. A flexible receptacle for fluent material composed of plastic sheet material, a relatively rigid cylindrical spout therefor secured to a surface of said receptacle about a communicating opening formed therein, a first integral external radially extending flange at the base of said spout, a second integral external radially extending flange on said spout spaced from the first flange, the latter being segmented and adapted to be frictionally projected through and resiliently anchored over the defining edge of a circular aperture formed in a paperboard container wall of smaller diameter than said second flange, a plurality of ribs adapted to be frictionally projected into said circular aperture-defining edge portion formed on the outer surface of said conduit intermediate said flanges, said spout including an externally threaded outer end portion of reduced diameter projecting beyond said flanges, and closure means in separable engagement with said outer end portion.

7. A flexible receptacle for fluent material composed of plastic sheet material, a relatively rigid cylindrical spout therefor secured to a surface of said receptacle about a communicating opening formed therein, a first integral external radially extending flange at the base of said spout, a second integral external radially extending flange on said spout spaced from the first flange, the latter being adapted to be frictionally projected through the defining edge of a circular aperture formed in a paperboard container wall of smaller diameter than said second flange, a plurality of ribs adapted to be frictionally projected into said circular aperture-defining edge portion formed on the outer surface of said conduit intermediate said flanges, said spout including an externally threaded outer end portion of reduced diameter projecting beyond said flanges, and closure means in separable engagement with said outer end portion, said closure means including a spaced pair of integral external radially extending flanges having a diameter substantially the same as that of the first mentioned pair of flanges, and a plurality of ribs adapted to be frictionally projected in sequence through said paperboard circular aperture defining edge portion formed on the outer surface of said closure intermediate its said pair of flanges.

8. In combination, a paperboard outer container, a flexible receptacle for fluent material composed of plastic sheet material, a relatively rigid cylindrical spout therefor secured to a surface of said receptacle about a communicating opening formed therein, a first integral external radially extending flange at the base of said spout, a second integral external radially extending flange on said spout spaced from the first flange a distance substantially that of the thickness of a wall of said container, said second flange being frictionally projected through the defining edge of a circular aperture formed in a container wall of smaller diameter than said second flange, and a plurality of longitudinally extending radially projecting ribs frictionally projected into said circular aperture-defining edge portion formed on the outer surface of said conduit intermediate said flanges, said second flange being composed of segments disposed between said ribs.

9. In combination, a paperboard outer container, a flexible receptacle for fluent material composed of plastic sheet material, a relatively rigid cylindrical spout therefor secured to a surface of said receptacle about a communicating opening formed therein, a first integral external radially extending flange at the base of said spout, a second integral external radially extending serrated beveled edge flange on said spout spaced from the first flange, the latter being frictionally projected through the defining edge of a circular aperture formed in a paperboard container wall of smaller diameter than said second flange and holding said spout anchored against withdrawal into said outer container, and a plurality of integral ribs on the outer surface of said conduit intermediate said flanges projecting to said serrations and frictionally projected into said circular aperture-defining edge portion to thereby retain said spout against relative rotation.

10. In combination, a paperboard outer container, a flexible receptacle for fluent material composed of plastic sheet material, a relatively rigid cylindrical spout therefor secured to a surface of said receptacle about a communicating opening formed therein, a first spaced pair of integral external radially extending flanges adjacent the outer end of said spout, and a second pair of integral external radially extending flanges on said spout spaced from the first flanges disposed adjacent the base end of said spout, the outer one of said first pair of flanges only being frictionally projected through the defining edge of a circular aperture formed in a paperboard container wall of smaller diameter than said spaced flanges, and a plurality of ribs frictionally projected into said circular aperture-defining edge portion formed on the outer surface of said conduit intermediate said flanges.

11. In combination, a paperboard outer container, a flexible receptacle for fluent material composed of plastic sheet material, a relatively rigid cylindrical spout therefor secured to a surface of said receptacle about a communicating opening formed therein, a first spaced pair of integral external radially extending flanges adjacent the outer end of said spout, and a second pair of integral external radially extending flanges on said spout spaced from the first flanges disposed adjacent the base end of said spout, the outer one only of said second pair of flanges and said first pair of flanges being frictionally projected through the defining edge of a circular aperture formed in a paperboard container wall of smaller diameter than said spaced flanges, and a plurality of ribs frictionally projected into said circular aperture-defining edge portion formed on the outer surface of said conduit intermediate said flanges.

12. In combination, a paperboard outer container, a flexible liner bag receptacle for fluent material composed of plastic sheet material disposed in said container, a relatively rigid cylindrical spout for said bag secured to a surface thereof about a communicating opening formed therein, a first integral external radially extending flange at the base of said spout, a second integral external radially extending flange on said spout spaced from the first flange, the latter being frictionally projected through the defining edge of a circular aperture formed in a containiner wall of smaller diameter than said second flange, a plurality of ribs frictionally projected into said circular aperture-defining edge portion formed on the outer surface of said conduit intermediate said flanges, said second flange being composed of segments disposed between said ribs, and closure means in separable engagement with the outer end of said spout.

13. In combination, a paperboard outer container, a flexible liner bag receptacle for fluent material composed of plastic sheet material disposed in said container, a relatively rigid cylindrical spout for said bag secured to a surface thereof about a communicating opening formed therein, a first integral external radially extending flange at the base of said spout, a second integral external radially extending flange on said spout spaced from the first flange, the latter being frictionally projected through the defining edge of a circular aperture formed in a container wall of smaller diameter than said second flange, a plurality of ribs frictionally projected into said circular aperture-defining edge portion formed on the outer surface of said conduit intermediate said flanges, said spout including an externally threaded outer end portion of reduced diameter projecting beyond said flanges, said second flange being composed of segments disposed between said ribs, and closure means in separable engagement with said outer end portion.

14. In combination, a paperboard outer container formed with a circular aperture in a defining wall thereof, a flexible receptacle for fluent material composed of plastic sheet material, a relatively rigid cylindrical spout therefore secured to a surface of said receptacle about a communicating opening formed therein, a first spaced pair of integral external radially extending flanges adjacent the base of said spout, said spout including an externally threaded outer end portion of reduced diameter projecting beyond said flanges, closure means in separable engagement with said outer end portion including a second spaced pair of integral external radially extending flanges of substantially the same diameter as said first flanges, a plurality of radially projecting ribs disposed between said flange pairs, the outer one of said first pair of flanges, and said second pair of flanges being of slightly larger diameter than said circular opening and adapted to be frictionally projected therethrough, and said ribs being adapted to extend into frictional engagement with said circular aperture-defining edge portion.

15. The assembly of claim 14 wherein said spout is projected through said circular aperture and wherein the flanges adjacent the base of the spout are in embracing engagement with the apertured wall about the defines of said aperture.

16. The assembly of claim 14 wherein said spout is projected through said circular aperture and wherein the flanges on said closure are in embracing engagement with the aperture wall about the defines of said aperture.

References Cited in the file of this patent
UNITED STATES PATENTS

| | | |
|---|---|---|
| 1,911,455 | Luff | May 30, 1933 |
| 2,454,919 | Hagan | Nov. 30, 1948 |
| 2,946,494 | Kuss | July 26, 1960 |
| 2,973,119 | Parker | Feb. 28, 1961 |
| 2,989,208 | Gibbs | June 20, 1961 |

FOREIGN PATENTS

| | | |
|---|---|---|
| 860,129 | Great Britain | Feb. 1, 1961 |